United States Patent [19]

Herzog et al.

[11] Patent Number: 4,520,700
[45] Date of Patent: Jun. 4, 1985

[54] TAILSTOCK FOR ROTATABLY MOUNTING A WORKPIECE IN PRECISION MACHINERY

[75] Inventors: Klaus Herzog, Oberkochen; Franz Szenger, Konigsbronn; Gabriele Gentner, Aalen-Ebnat, all of Fed. Rep. of Germany

[73] Assignee: Carl-Zeiss-Stuftung, Heidenhheim/Brenz, Oberkochen, Fed. Rep. of Germany

[21] Appl. No.: 445,536

[22] Filed: Nov. 30, 1982

[30] Foreign Application Priority Data

Oct. 7, 1982 [DE] Fed. Rep. of Germany ....... 3237083

[51] Int. Cl.³ .................. B23B 17/00; B23B 23/00; B23F 23/12; G01B 5/20
[52] U.S. Cl. ........................................ 82/31; 82/32; 82/DIG. 1; 33/179.5 R; 33/179.5 D; 269/254 CS; 409/238
[58] Field of Search ............... 82/31, 32, DIG. 1; 33/179.5 R, 179.5 D; 409/235, 238, 242; 408/237, 236, 237; 269/254 CS, 296, 55

[56] References Cited

U.S. PATENT DOCUMENTS

| 804,947 | 11/1905 | Hapgood | 177/175 |
| 1,357,696 | 11/1920 | Eberhardt | 409/235 |
| 2,664,787 | 1/1954 | Plimmer | 409/107 |
| 2,957,392 | 10/1960 | Zwick et al. | 82/DIG. 1 |
| 3,071,862 | 1/1963 | Daniel et al. | 33/179.5 D |
| 3,264,905 | 8/1966 | Erikson | 82/32 |
| 4,100,837 | 7/1978 | Kohler | 409/238 |

FOREIGN PATENT DOCUMENTS

| 1477101 | 6/1969 | Fed. Rep. of Germany | 408/234 |
| 612109 | 7/1979 | Switzerland | 82/31 |

OTHER PUBLICATIONS

Frank Murray, *American Machinist/Metalworking Manufacturing*, 12/26/60, p. 82.
Federico Strasser, *Product Engineering*, 3/7/60, p. 61.

*Primary Examiner*—Francis S. Husar
*Assistant Examiner*—William E. Terrell
*Attorney, Agent, or Firm*—Hopgood, Calimafde, Kalil, Blaustein & Judlowe

[57] ABSTRACT

A tailstock for rotatably supporting a workpiece on a machine bed. The tailstock includes a vertical column fixed at the machine bed which has first and second regions. The second region of the column is coaxial with the first region and pivotally mounted to the first region. An offset arm extends laterally from the vertical column and carries a center for engaging the workpiece. The offset arm has an opening for accommodating the regions of the vertical column and is longitudinally displaceable thereon. The offset arm is pivotable when disposed at the second region and non-pivotable when disposed at the first region to dispose same in repeatable precision relation to the machine bed.

10 Claims, 12 Drawing Figures

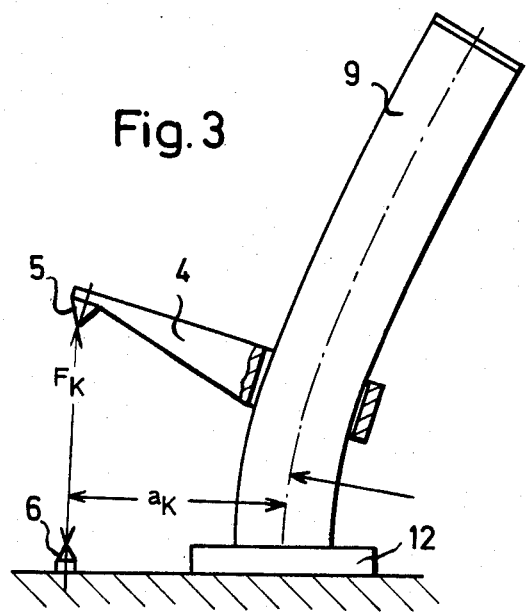
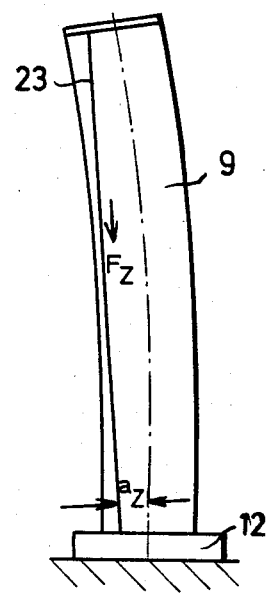
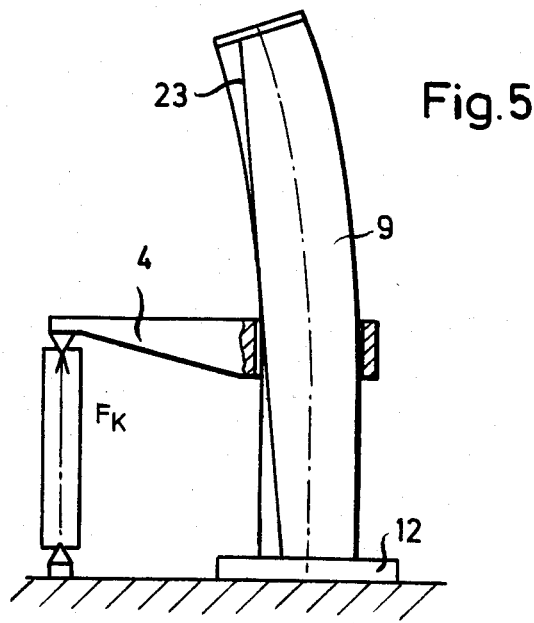

TAILSTOCK FOR ROTATABLY MOUNTING A WORKPIECE IN PRECISION MACHINERY

BACKGROUND OF THE INVENTION

The invention relates to a centering rest, as for location of a rotary axis of symmetry of a workpiece. So-called "tailstocks" or "center rests" are used on lathe and the like machine tools and on measuring devices, to provide support for rotatably chucked cylindrical workpieces such as gearwheels. The center rest clamps at least one axial end of the workpiece at a center (point) in the axis of rotation of the workpiece. In such supports, the receiving center (hereinafter sometimes referred to as the "opposing center") is axially opposite the rotary drive and is displaceable in the direction of the axis of rotation, to permit the clamping of workpieces of different axial length. As a rule, the tailstock or opposing center is carried by an arm which is longitudinally guided at offset from the axis of rotation and parallel thereto.

Since spaced centers determine location of the rotary axis of the workpiece which is to be machined or measured, the work-engaging center, which is carried by the displaceable arm of the tailstock, should lie, for all clamping distances, in exactly reproducible manner on a predetermined straight line. In this connection, permissible tolerances must be within the micrometer or sub-micrometer range.

However, such a requirement cannot generally be satisfied without special measures. First sources of error are attributable to guidance of the arm, which must be machined very accurately, since rotation about the longitudinal axis of the guide column have an effect, enhanced by the length of the arm, on the work-centering position of the tailstock. Secondly, thermal effects can cause changes in length of the arm, with resultant offsetting displacement of the center point. Another source of error resides in the mounting of the center rest to the machine.

Center rests form a fixed part of machines on which they are developed. If they are removably attached, then, after attachment or reattachment, the tailstock must be set accurately with its work-engaging center in alignment with the rotary axis of the machining or measuring device, and guidance of the tailstock arm must be aligned parallel to this axis. Such adjustment work requires a relatively great amount of time and shortens the useful life of the machine.

Universal machining and measuring machines are known which are not used exclusively for the working of cylindrical workpieces. In this case, a center rest (which is required only for workpieces of cylindrical symmetry) greatly limits the work area of the machine when it is not required, since the tailstock arm interferes with the path of travel of movable carriages of the machine. On the other hand, removal and reattachment of the center rest makes the above-mentioned adjustment work necessary.

BRIEF STATEMENT OF THE INVENTION

The object of the present invention is to provide an improved center rest whereby it becomes possible to substantially eliminate adjustment work for readjusting the position of the tailstock, when making a change in workpieces.

This object can be divided into three specific subordinate objects, namely:

1. To regenerate or retain the guidance alignment of the arm exactly parallel to the axis of rotation, even when the arm is removed from the work area of the machine.
2. To compensate for change in length of the arm as a result of thermal effects.
3. To attain a highly precise arm guidance, insensitive to transverse forces.

The invention achieves the foregoing objects in a machine using a tailstock for rotatable support of a chucked workpiece. The offsetting arm which mounts the work-engaging center is longitudinally guided by a (main) guide column and, in addition is shiftable for (auxiliary) rotation about the guide column; the guide column is positioned at the edge of or entirely outside the working area of the machine, so that the guide axis is at all times fixed in space, maintaining parallelism of the guide axis and the work-rotating axis at all times.

The end region of the guide column is swingable or turnable, and therefore the arm itself does not require any articulation which would have an effect on the precision of positioning the center. The form-lock between arm, guide and machine bed is therefore accurately reproduced each time that the arm is shifted out of the auxiliary guide (rotary) and back into the main guide (longitudinal).

For guidance of the arm a plain bearing is provided which utilizes roller elements in conjunction with a guide column of polygonal section, such that, in the presence of force transverse to the guidance direction, only rolling friction occurs, as distinguished from the sliding friction which characteristic of a plain bearing in the presence of equivalent transverse force. The roller elements are yieldably retained in orientation parallel to the guide axis, and the arrangement is such that when transverse force reduces to zero, the arm returns to its position of rest with a precision which is increased by a factor equal to the ratio of the coefficients of friction for rolling and for sliding friction.

In this connection, there is also a slight movement of the roller elements relative to the guided part, i.e. to the bearing portion of the arm. The roller elements are therefore preferably mounted to the guided bearing portion via an elastic adhesive composition which yields within the involved slight displacement regions. Another possibility for mounting the rollers is to retain them in yieldable roller cages.

A lever mechanism is provided to compensate for thermal changes in length of the arm; this mechanism contains an elongation member consisting of material having a coefficient of thermal elongation which differs from that of the arm. The elongation member engages a holder of the work-engaging center, and the holder is pivotally mounted to the arm. With this arrangement, it is possible, by a suitable selection of distances involved in the engagement point of the elongation member, in relation to the pivotal mounting of the work-engaging center in the arm, and by adapting these dimensional distances to the materials used for the arm for the elongation member, to have assurance at all times that the work-engaging center will retain its fixed position, even in the circumstance of relatively great temperature changes.

The work-engaging center of the tailstock is advisedly developed as a ball center whereby small tilt misalignment of the holder of the center (resulting from compensation movements) can remain insignificant as long as the center of tilt coincides with the center of the ball.

Means for compensating for thermal changes in length are, to be sure, in themselves known. In this connection, mention may be made of the pendulums of regulators, as well as devices on boring machines, such as those described in West German Pat. Nos. 1,010,802, 2,450,322, West German Nos. OS 2,558,625 and 3,106,701. In the known compensating devices, however, bars of materials of different coefficients of expansion are secured to one another in the manner of a serial connection, so that the position-stabilized end region which generally serves as the reference mark is extremely unstable to transverse forces due to the relatively great length of the frequently twice-folded arrangement. In contradistinction to this, the lever mechanism of the present invention consists of bars or strips of different thermal expansion which are connected with each other in the manner of a substantially parallel-related connection. Even those transverse forces perpendicular to the longitudinal axis of the arm which occur when clamping to the workpiece are well accommodated by this arrangement.

It is advantageous for the arm of the center rest to contain an adjustable clamping device for applying constant clamping force on the work-engaging center, since the work-engaging force of the center reacts in its turn on the guidance of the arm, and constant force conditions have a positive effect on positional reproducibility of the work-engaging center, i.e. on the precision of its positioning.

It is further advisable for the arm guide to be arcuately deformed in the plane of the arm, i.e. in the plane established by the guide and the axis of work rotation. The bending stress which causes this deformation can be so selected that it is opposite and equal to the bending moment exerted by the means for clamping the arm to the guide, the selection being such that in the loaded condition, i.e. when the workpiece is clamped, the guide is in all cases aligned parallel to the axis of the workpiece. On the other hand, bending of the guide in the unloaded condition is completely irrelevant to the precise alignment of the workpiece, which is the only thing of importance.

To stabilize the guidance of the arm and to establish the indicated deformation (in the unloaded condition), tension or pressure bars may suitably be provided within the polygonal section of the guide body.

Since the bearing for the arm in the direction of the guidance is a plain bearing, it can be made self-locking; in other words, upon development of clamping force at engagement of the center with the workpiece (by means of the above-indicated clamping device), self-locking occurs as a result of the relatively great distance between the point of force application and the offset location of arm guidance, so that separate clamping of the guide engagement is unnecessary.

Operator-induced forces for arm displacement, induced in the vicinity of the guide, do not produce any self-locking. If a handle is provided for such manipulation and clamping of the tailstock, i.e. if the handle is provided in the vicinity of arm engagement with the guide column, the advantage is obtained that a traversing of the arm, a clamping of the workpiece, and a clamping of the arm to the guide can all be effected by this single operating handle.

DETAILED DESCRIPTION

Various illustrative embodiments of the invention will be described in detail in conjunction with the accompanying drawings in which:

FIGS. 3, 4 and 5 are simple diagrams of the center rest of FIG. 1, to show various considerations of guide-column design, and with an exaggerated showing of the deformations of the guide column;

Figure 1:
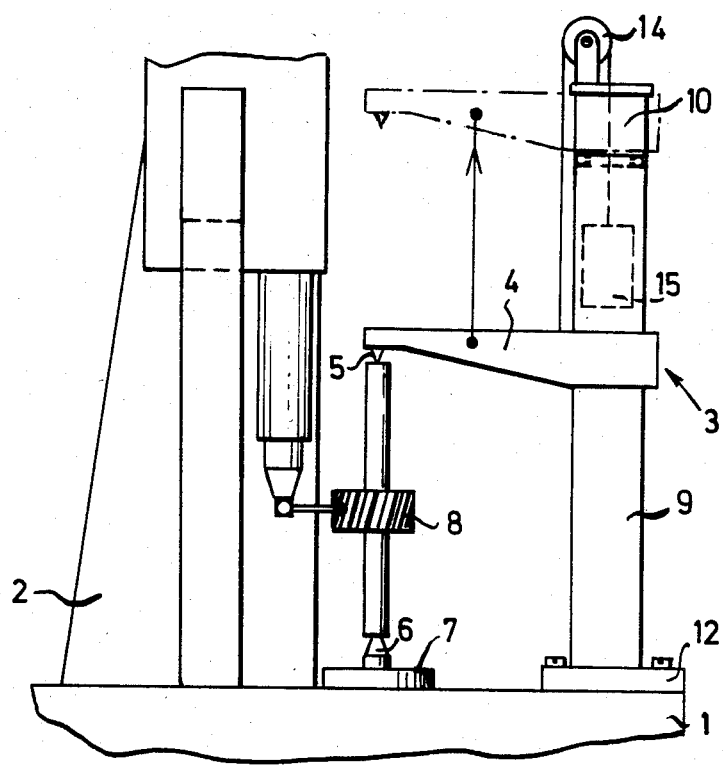
FIG. 1 is a side view of a center rest mounted to a measurement machine.
Figure 2:
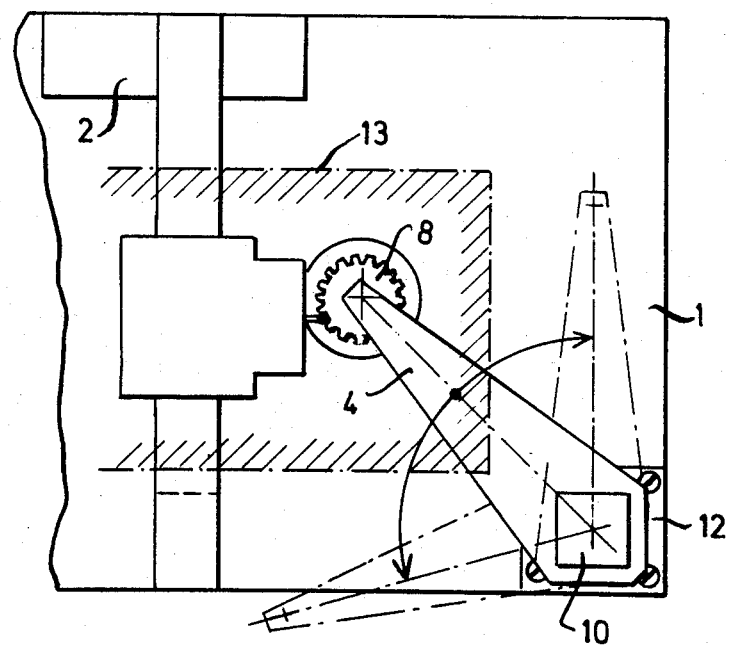
FIG. 2 is a plan view of the center rest of FIG. 1.

In FIGS. 1 and 2, a center rest or tailstock 3 is mounted by its base plate 12 upon the flat horizontal working surface of a granite table 1 which also mounts the traversable portal 2 of a multiple-coordinate measurement machine. The useful measurement area of the measurement machine is indicated in FIG. 2, within limits of hatching 13.

The center rest 3 comprises a guide column 9 along which an offsetting arm 4 is readily displaceable in the vertical direction, by reason of a pulley 14 and a counterweight 15 which is movable within the square cross-section of the walls of guide column 9. Arm 4 carries a work-engaging center 5, corresponding and opposed to a center 6 on a turntable 7 which is rotatably mounted in the granite bed 1 of the machine. A workpiece 8 is clamped between the centers 5 and 6.

The end region 10 of guide 9 is mounted for rotation about the longitudinal axis of the guide column 9. As indicated by arm (4) positions shown in phantom lines in FIGS. 1 and 2, once arm 4 has been displaced to the end or auxiliary-guide region 10 of column 9, it can be swung together with column part 10 and thus can be removed from the working area 13 of the measurement machine 2. After each return swing back into the working position and down-shifted replacement on guide 9, the work-engaging center 5 again lies precisely on the axis of workpiece (8) rotation since the position of column 9 does not change in the course of swing action; thus, parallelism is retained as between guide column 9 and the axis of the workpiece 8.

Upon clamping the workpiece 8, a force $F_k$ acts on the center 5, which force bends guide column 9 via arm 4, as shown in exaggerated manner in FIG. 3. The bending moment $M_k$ acting on column 9 amounts to $$M_k = a_k \cdot F_k,$$

in which $a_k$ is the offsetting distance between center 5 and guide column 9. This bending moment $M_k$ is independent of the vertical position of arm 4 along column 9 and may therefore be viewed as constant.

Now, a similar constant bending moment M can be produced within column 9, by the tensile force $F_z$ of a tie-rod 23 clamped between the cover and the bottom of the guide column 9 and at a distance $a_z$ from the center of column 9 (see FIG. 4). If one so designs the machine that the products $F_k \cdot a_k$ and $F_z \cdot a_z$ are equal and of opposite sign, then the deformation of guide column 9 (due to clamp force $F_k$) can be well compensated by tensile force $F_z$ in the region between the base plate 12 and the location of arm (4) engagement (see FIG. 5).

Figure 6:
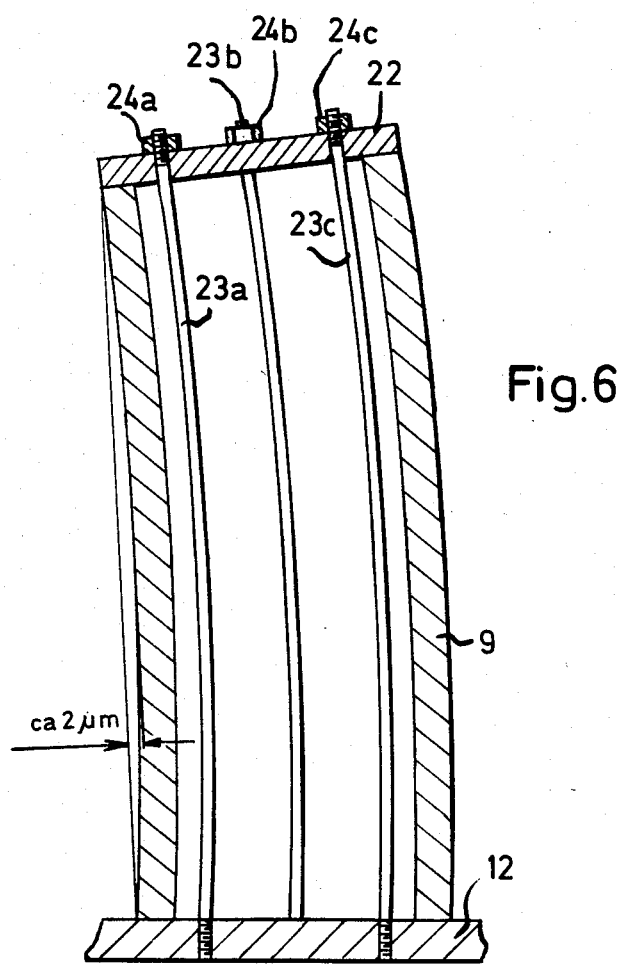
FIG. 6 is an enlarged view in vertical section through the guide column of FIG. 4.
Figure 7:
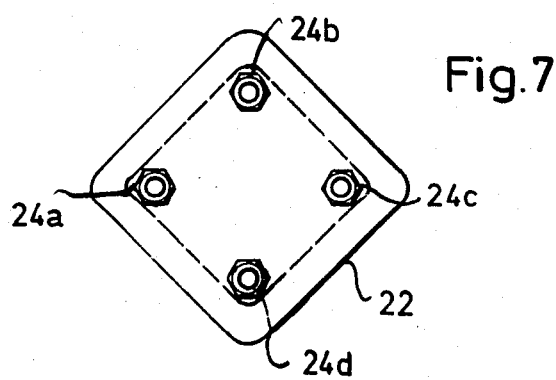
FIG. 7 is a plan view of the closure plate at the top of the guide column of FIG. 6.

FIGS. 6 and 7 illustrate that such compensation within guide column 9 is realized using four tie-rods 23a–d, all equally offset from the central axis of column 9, and also offset from the respective wall corners within column 9. Tie rods 23 are screwed into the base plate 12; they extend through corresponding holes in cover plate 22, and their length can be adjustably shortened by means of nuts 24a–d.

It will be seen that by means of these tie-rods, column 9 may be accurately oriented in two component directions in space, not only to compensate for the above-explained deformation toward the axis of the workpiece, but also to correct for such residual defects in the guide path of column 9 as may exist in the component direction of the connecting line between rods 23b and 23d.

Figure 8:
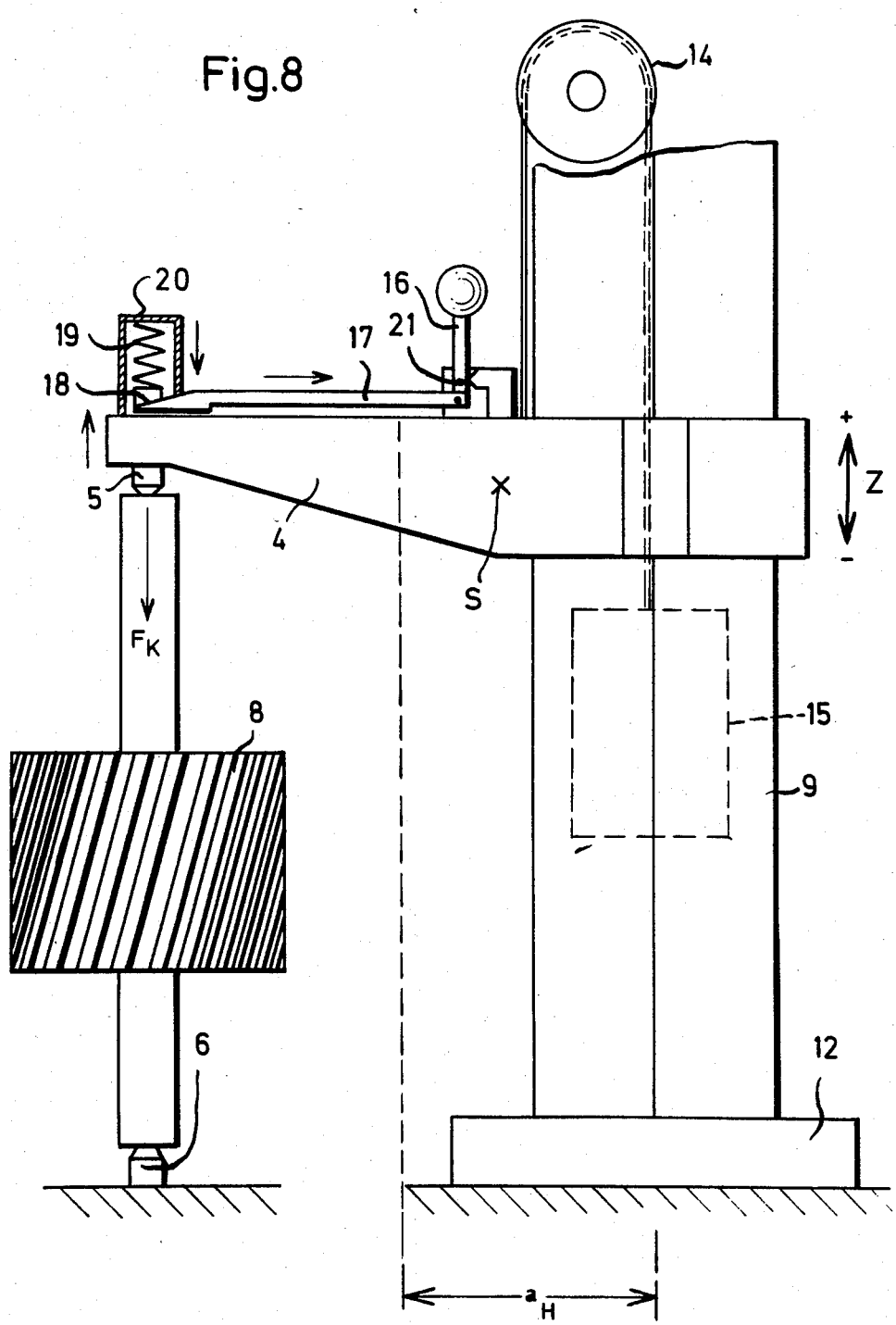
FIG. 8 is an enlarged and more detailed showing of the center rest of FIG. 1, in clamped application to a workpiece.

FIG. 8 shows a preferred arrangement by means of which the constant clamping force $F_k$ between the centers 5 and 6 is applied to workpiece 8. This arrangement comprises a loading spring 19 which is referenced to a housing part 20 of arm 4 and which is compressionally loaded against the upper end of the work-engaging center 5; for workpiece engagement, the force $F_k$ of spring 19 can be released by an operating lever 16, in the vicinity of guide column 9. Movement of operating lever 16 about its pivot axis 21 is transmitted by a rod 17 to a wedge 18 having cam engagement with the rear part of center 5.

Figure 9:
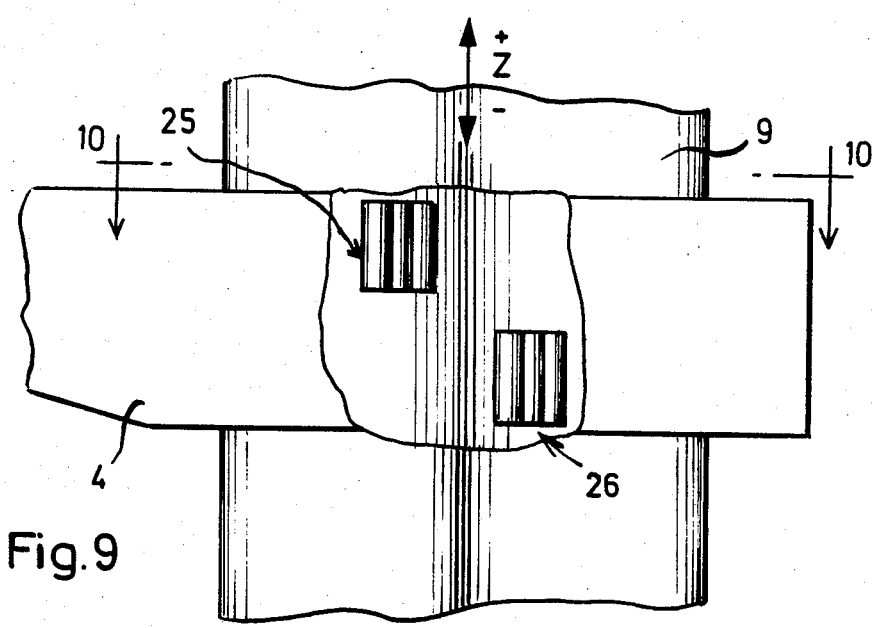
FIG. 9 is a further-enlarged fragmentary view to illustrate arm and guide column engagement, for the center rest of FIGS. 1 and 8.
Figure 10:
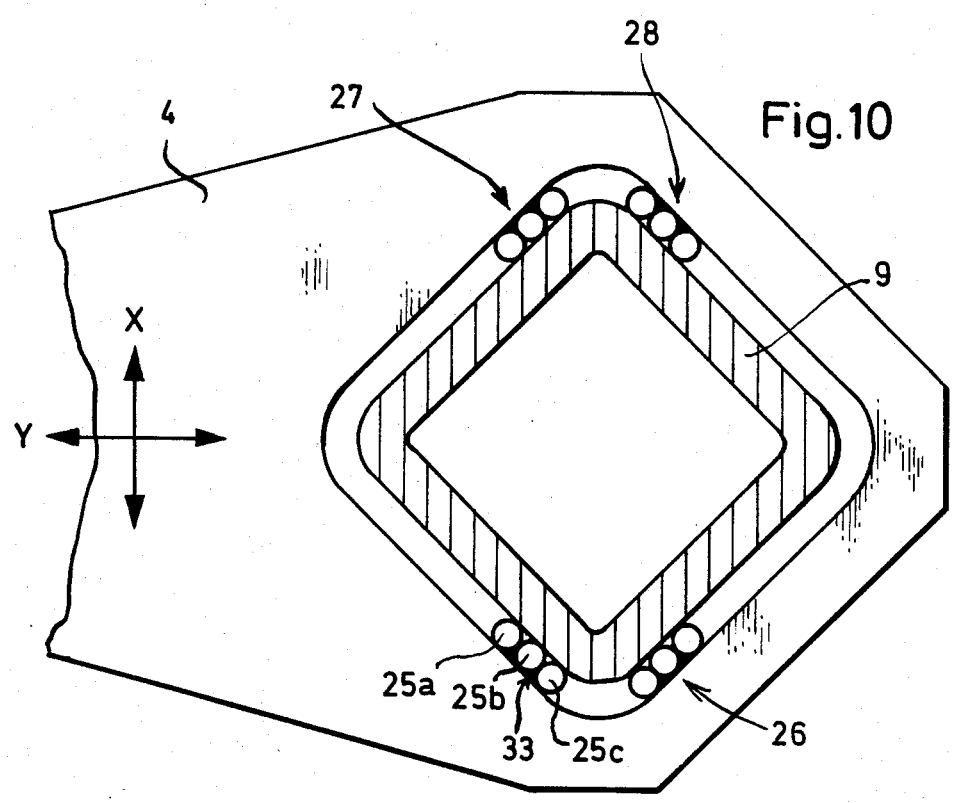
FIG. 10 is a cross-sectional view of the arm-and-guide engagement of FIG. 9, as seen in the plane 10—10 of FIG. 9.

Guidance of arm 4 is effected via a plain bearing which as a bearing body has four groups 25 to 28 of three rollers each (FIGS. 9 and 10). These rollers are arranged with their longitudinal axes parallel to the direction of guidance and are contained under initial preload in the gap between guide column 9 and the surrounding bearing portion of arm 4.

Rollers 25a–c to 28a–c are in each case fixed by an elastic adhesive composition 33 to the arm 4 and thus permit practically frictionless—i.e. very precise—return of the arm 4 into its position of rest after a twisting of the bearing, for example, as a result of transverse forces which act on the arm.

The parallel arrangement of three rollers each has been selected since the bearing-contact surface of the involved slide bodies is thereby increased as compared with only one roller, thus better integrating the microgeometry of the guide.

As best seen in FIG. 9, the respective pairs of three-roller groups 25/27 and 26/28 of the front and rear bearing parts are in vertically staggered array, as viewed from the center 5, and self-locking of this bearing occurs (1) whenever workpiece-engagement forces are applied to the center 5 and (2) when the point of force application is outside the range $a_H$ (see FIG. 8) from the central axis of guide column 9, said range $a_H$ extending beyond the point S, which designates the center of gravity of arm 4. This condition is satisfied for the workpiece-clamping process, but not for an operator's displacement of arm 4 when he is actuating lever 16. Such person therefore is able merely to raise or lower lever 16 to displace arm 4 freely in the vertical direction and, by pivoted actuation of lever 16, to release the workpiece-clamping force, as a result of which the guided support of arm 4 is automatically clamped.

Figure 11:
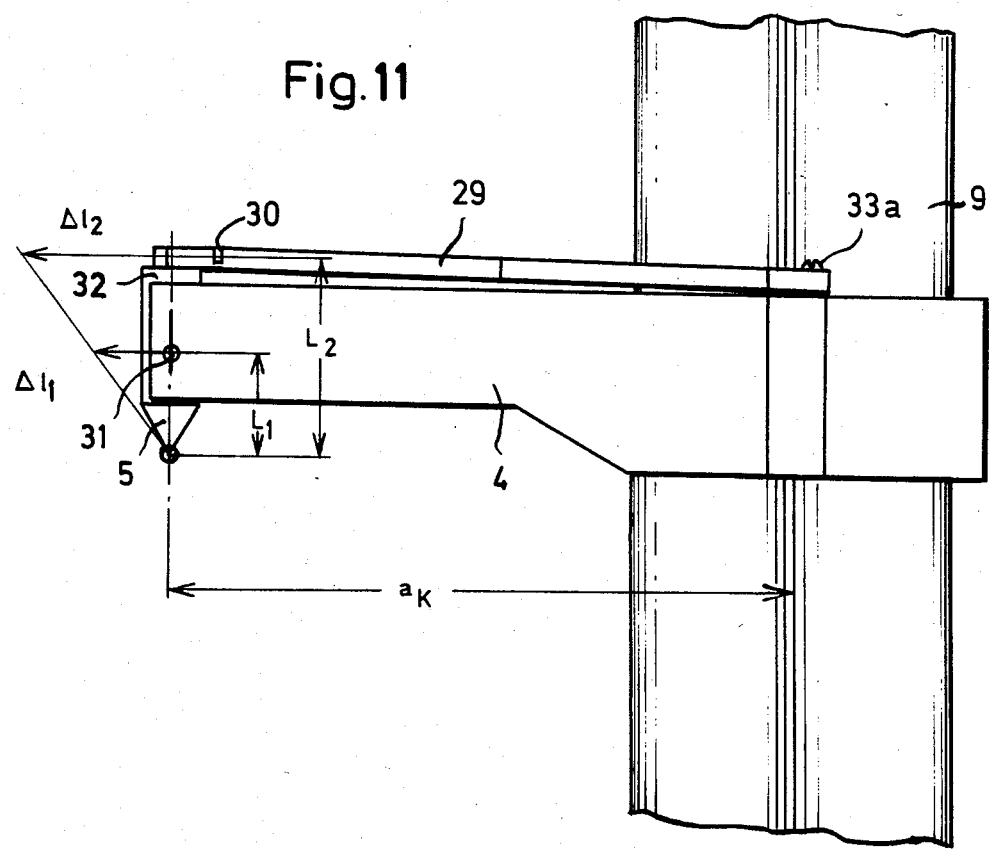
FIG. 11 is a side view to illustrate modification of the arm of the center rest of FIG. 1, to compensate for thermal elongation.
Figure 12:
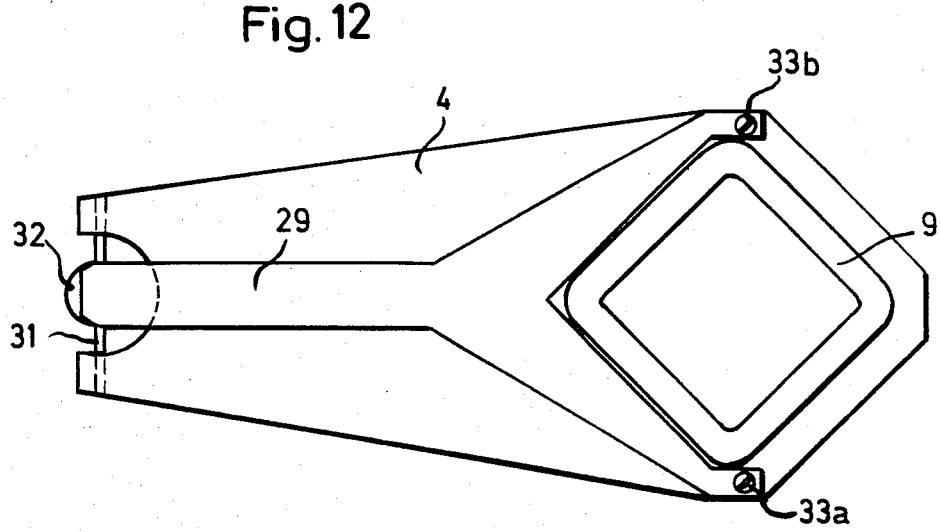
FIG. 12 is a plan view of the modified arm and center rest of FIG. 11.

FIGS. 11 and 12 show a system for thermally stabilizing the length of arm 4; and it will be understood that, for reasons of simplicity of illustration, this arrangement has been omitted from FIG. 8 and that, for the same reasons, the clamping device of FIG. 8 has been omitted from FIGS. 11 and 12. Of course, it is readily possible to equip arm 4 with both arrangements at the same time.

Stabilization of the length of arm 4 can be of importance in particular when the material of the machine table 1 of FIG. 1 has a coefficient of thermal expansion which is different from that of tailstock arm 4, or when the heat capacity of table 1 is so much greater than that of arm 4 that, for all practical purposes, variations in temperature have an effect only on the length of arm 4.

In order to maintain the position of center 5 fixed in space, i.e. to hold constant its distance $a_k$ from the central axis of column 9, the support body or holder 32 of center 5 is pivotally suspended via a transverse pin 31 within a recess between bifurcations at the end of arm 4. Arm 4 is of steel. And a strip 29 of aluminum, arranged substantially parallel to arm 4, is mounted thereto via screws 33a and 33b, such that its other end is fastened to the upper end of the support or holder 32 for center 5. Near its point of contact with the upper end of support 32, strip 29 is greatly narrowed by a transverse groove 30. Groove 30 serves to effectively provide strip 29 with a pivot point.

If the length of arm 4 changes by the incremental amount $\Delta l_1$ as a result of thermal elongation, then strip 29 will be lengthened by the greater increment $\Delta l_2$, due to the greater coefficient of expansion $\alpha_2$ of aluminum as compared with the coefficient of expansion $\alpha_1$ of steel. And if one so provides the distance $L_1$ (between the center point of the ball of center 5 and pin 31) and the distance $L_2$ (between the center point of the ball and the point of ball-holder (32) attachment strip 29) as to satisfy the condition:

$$L_1/L_2) = \alpha_1/\alpha_2,$$

then the position of the ball center 5 is invariant with temperature, i.e. the distance $a_k$ between center 5 and guide 9 remains constant. In this connection, it is presumed that the strip 29 has the same length as arm 4, and that the two parts in each case assume the same temperature.

Naturally, the described arrangement for stabilizing effective arm length is valid even if the lengths of the strip 29 and of the arm 4 are different. In the latter case, however, the above-indicated simple relationship no longer applies as between the pivot-point spacings $L_1$, $L_2$ and the coefficients of expansion.

The center 5 is developed as a ball center. In this way, the result is obtained that small tilted inclinations of the support 32 of center 5 (resulting from compensation displacements) remain without substantial effect on the axially correct position of the workpiece, even in the case of workpieces having large centering bores, since the points of application between workpiece and ball surface lie approximately at the same elevation as the temperature-invariant ball-center points.

What is claimed is:

1. A tailstock for rotatably supporting a workpiece on a machine bed comprising:
   a vertical column fixedly mounted to said machine bed, said vertical column having first and second regions, said second region being pivotally mounted to said first region, the pivotal axis of said second region being parallel to the longitudinal axis of said first region;
   an offset arm extending laterally from said vertical column and carrying a workpiece engageable center, said arm having an opening for accommodating said first and second regions of said vertical column, said offset arm being displaceable along the longitudinal axis of said vertical column;
   said offset arm being displaceable from said first region of said vertical column to said second region of said vertical column, said offset arm being pivotable about said pivotal axis when said offset arm is disposed at said second region of said vertical column and non-pivotable when disposed at said first region of said vertical column to thereby be disposed in precise spacial relation with said machine bed.

2. The tailstock as claimed in claim 1, wherein said offset arm includes a releaseable clamping means for applying a constant application force ($F_k$) to said workpiece engageable center.

3. The tailstock as claimed in claim 1, further including means for providing an adjustable bending force to said vertical column to compensate the forces generated in clamping said workpiece.

4. The tailstock as claimed in claim 3, wherein said vertical column is hollow and said bending force providing means comprise rods disposed within said column, said rods capable of providing a compression and tension force to thereby bend said column.

5. The tailstock as claimed in claim 2, wherein said clamping means includes a manually adjustable release lever disposed on said offset arm proximate to said vertical column.

6. The tailstock as claimed in claim 1, wherein said vertical column is hollow and includes a counterweight therein, said counterweight being coupled to said offset arm to counterbalance the weight of said offset arm.

7. The tailstock as claimed in claim 1, wherein said workpiece engageable center is pivotally mounted to said arm and further including thermal expansion compensating means, said compensating means comprising an elongation member disposed on said offset arm, said elongation member being constructed of a material having a coefficient of thermal elongation differing from that of said offset arm, one end of said elongation member being pivotally connected to said workpiece engageable center.

8. The tailstock as claimed in claim 7, wherein said workpiece engageable center comprises a ball center.

9. A tailstock for rotatably supporting a workpiece on a machine bed comprising:
   a column fixedly mounted to said machine bed;
   an offset arm extending laterally from said vertical column and carrying a workpiece engageable center, said offset arm having an opening for accommodating said column, said offset arm being displaceable along the longitudinal axis of said column; and
   plain bearing in the form of cylinders disposed between said column and the opening in said offset arm, the longitudinal axis of said cylinders being parallel to that of said column, said cylinders being yieldably retained to said offset arm, and said cylinders being yieldable in a direction perpendicular to that of said column.

10. The center rest according to claim 9, wherein said plain bearings in the form of cylinders are yieldably retained by means of an elastic adhesive composition disposed between said cylinders and said offset arm.

* * * * *